United States Patent
Josiam et al.

(10) Patent No.: US 9,661,612 B2
(45) Date of Patent: May 23, 2017

(54) METHODS AND APPARATUS FOR UPLINK CONTROL CHANNEL MULTIPLEXING IN BEAMFORMED CELLULAR SYSTEMS

(71) Applicant: Samsung Electronics Co., LTD, Suwon-si, Gyeonggi-do (KR)

(72) Inventors: Kaushik Josiam, Dallas, TX (US); Zhouyue Pi, Allen, TX (US); Ying Li, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 570 days.

(21) Appl. No.: 13/920,965

(22) Filed: Jun. 18, 2013

(65) Prior Publication Data

US 2014/0003369 A1 Jan. 2, 2014

Related U.S. Application Data

(60) Provisional application No. 61/666,615, filed on Jun. 29, 2012.

(51) Int. Cl.
| | |
|---|---|
| H04W 72/04 | (2009.01) |
| H04W 56/00 | (2009.01) |
| H04L 5/00 | (2006.01) |
| H04B 7/08 | (2006.01) |
| H04L 27/26 | (2006.01) |

(52) U.S. Cl.
CPC ........ H04W 72/0406 (2013.01); H04B 7/086 (2013.01); H04L 5/0023 (2013.01); H04L 5/0053 (2013.01); H04L 5/0094 (2013.01); H04W 56/0045 (2013.01); H04L 27/2607 (2013.01)

(58) Field of Classification Search
None
See application file for complete search history.

(56) References Cited

U.S. PATENT DOCUMENTS

| | | | | |
|---|---|---|---|---|
| 5,535,423 A | * | 7/1996 | Dupuy | H04B 7/0491 455/449 |
| 5,628,052 A | * | 5/1997 | DeSantis | H04B 7/061 370/334 |
| 5,889,474 A | * | 3/1999 | LaDue | G08B 21/22 340/10.41 |
| 6,684,074 B1 | * | 1/2004 | Hong | H04W 88/08 455/436 |

(Continued)

FOREIGN PATENT DOCUMENTS

KR 20110033009 A 3/2011

OTHER PUBLICATIONS

International Search Report dated Oct. 16, 2013 in connection with International Patent Application No. PCT/KR2013/005761, 3 pages.

(Continued)

*Primary Examiner* — Andrew Oh

(57) ABSTRACT

Methods and apparatus of a base station (BS) or a user equipment (UE) that communicate with each other via one or more directional beams. The BS sends and the UE receives a timing advance (TA). The BS receives information sent by the UE via a receive beam of the one or more directional beams of the BS and via an uplink (UL) control region of an UL control channel. The UL control region of the UL control channel identified via the TA and the receive beam.

21 Claims, 12 Drawing Sheets

(56) References Cited

U.S. PATENT DOCUMENTS

| | | | |
|---|---|---|---|
| 6,731,954 B1 | 5/2004 | Katz | |
| 8,433,249 B2* | 4/2013 | Krishnamurthy | H04L 5/0053 455/63.1 |
| 8,908,657 B2* | 12/2014 | Oizumi | H04W 72/0446 370/336 |
| 2004/0179627 A1* | 9/2004 | Ketchum | H04B 7/0421 375/267 |
| 2005/0090256 A1* | 4/2005 | Dutta | H04B 7/18545 455/435.2 |
| 2006/0040706 A1 | 2/2006 | Wu et al. | |
| 2006/0256761 A1* | 11/2006 | Meylan | H04B 7/0417 370/338 |
| 2007/0153760 A1* | 7/2007 | Shapira | H04B 7/2681 370/350 |
| 2008/0085715 A1 | 4/2008 | Alm et al. | |
| 2008/0274690 A1* | 11/2008 | Laufer | H04B 7/18515 455/13.4 |
| 2009/0023467 A1* | 1/2009 | Huang | H04B 7/0417 455/522 |
| 2009/0131098 A1* | 5/2009 | Khandekar | H04W 48/08 455/525 |
| 2009/0318157 A1* | 12/2009 | Hoshino | H04B 7/0452 455/450 |
| 2010/0067461 A1* | 3/2010 | Kwak | H04L 1/0026 370/329 |
| 2010/0172340 A1* | 7/2010 | Muharemovic | H04W 56/0045 370/350 |
| 2010/0195575 A1* | 8/2010 | Papasakellariou | H04W 36/385 370/328 |
| 2010/0202373 A1* | 8/2010 | Chun | H04L 1/0027 370/329 |
| 2010/0220711 A1* | 9/2010 | Ishii | H04W 56/007 370/350 |
| 2010/0304745 A1* | 12/2010 | Patel | H04W 52/143 455/435.1 |
| 2010/0315962 A1* | 12/2010 | Imai | H04B 7/2615 370/252 |
| 2011/0021232 A1* | 1/2011 | Kazmi | H04L 5/0007 455/509 |
| 2011/0092238 A1* | 4/2011 | Ishibashi | H04L 5/0023 455/509 |
| 2011/0098074 A1* | 4/2011 | Seo | H04L 5/0007 455/509 |
| 2011/0134747 A1* | 6/2011 | Kwon | H04L 1/1607 370/208 |
| 2011/0188599 A1* | 8/2011 | Kang | H04B 7/02 375/267 |
| 2011/0223883 A1 | 9/2011 | Ishii et al. | |
| 2011/0243040 A1* | 10/2011 | Khan | H04B 7/0617 370/280 |
| 2011/0243066 A1* | 10/2011 | Nayeb Nazar | H04L 1/007 370/328 |
| 2011/0299573 A1* | 12/2011 | Sun | H04B 7/024 375/219 |
| 2012/0002631 A1* | 1/2012 | Nishio | H04L 5/001 370/329 |
| 2012/0033561 A1* | 2/2012 | Kawamura et al. | 370/252 |
| 2012/0057449 A1* | 3/2012 | Takaoka | H04B 1/713 370/210 |
| 2012/0069826 A1* | 3/2012 | Nakao | H04L 5/0007 370/336 |
| 2012/0082263 A1* | 4/2012 | Ebrahimi Tazeh Mahalleh | H04B 7/0669 375/299 |
| 2012/0089880 A1* | 4/2012 | Nakao | H04L 1/1607 714/748 |
| 2012/0093059 A1* | 4/2012 | Bai | H04L 5/0007 370/312 |
| 2012/0093067 A1* | 4/2012 | Lv | H04B 7/15542 370/315 |
| 2012/0140728 A1* | 6/2012 | Nakao | H04L 1/1692 370/329 |
| 2012/0170570 A1* | 7/2012 | Chang | H04W 56/005 370/350 |
| 2012/0201164 A1* | 8/2012 | Jongren | H04L 5/0048 370/252 |
| 2012/0224529 A1* | 9/2012 | Ishii | H04W 48/02 370/328 |
| 2012/0294252 A1* | 11/2012 | Kwon | H04L 5/0053 370/329 |
| 2012/0307726 A1* | 12/2012 | Pi | H04J 11/0069 370/328 |
| 2012/0320848 A1* | 12/2012 | Chen | H04W 28/06 370/329 |
| 2013/0021920 A1* | 1/2013 | Nakao | H04L 1/0027 370/242 |
| 2013/0028109 A1* | 1/2013 | Jongren | H04W 16/32 370/252 |
| 2013/0034010 A1* | 2/2013 | Gao | H04L 5/0023 370/252 |
| 2013/0064199 A1* | 3/2013 | Kim | H04J 11/0023 370/329 |
| 2013/0064210 A1* | 3/2013 | Nakao | H04J 11/0079 370/329 |
| 2013/0083833 A1* | 4/2013 | Robert | H04B 7/0417 375/224 |
| 2013/0128767 A1* | 5/2013 | Chun et al. | 370/252 |
| 2013/0156003 A1* | 6/2013 | Liang | H04L 5/0053 370/330 |
| 2013/0195066 A1* | 8/2013 | Lee | H04L 1/1607 370/329 |
| 2013/0235837 A1* | 9/2013 | Suo | H04L 5/0062 370/329 |
| 2013/0242815 A1* | 9/2013 | Wang | H04L 1/1854 370/280 |
| 2013/0250925 A1* | 9/2013 | Lohr et al. | 370/336 |
| 2013/0251058 A1* | 9/2013 | Wu | H04B 7/0456 375/267 |
| 2013/0286993 A1* | 10/2013 | Lee | H04L 5/001 370/329 |
| 2013/0294418 A1* | 11/2013 | Vukovic | H04J 11/0063 370/336 |
| 2013/0295976 A1* | 11/2013 | Patil | H04W 24/10 455/501 |
| 2013/0308503 A1* | 11/2013 | Kim | H04L 5/0053 370/280 |
| 2013/0315186 A1* | 11/2013 | Kim | H04W 72/0406 370/329 |
| 2013/0322397 A1* | 12/2013 | Lee | H04W 56/0045 370/329 |
| 2014/0003381 A1* | 1/2014 | Lee | H04L 1/0026 370/329 |
| 2014/0029586 A1* | 1/2014 | Loehr | H04W 56/0005 370/336 |
| 2014/0050186 A1* | 2/2014 | Kim | H04W 56/0045 370/329 |
| 2014/0079008 A1* | 3/2014 | Park | H04L 1/1896 370/329 |
| 2014/0086224 A1* | 3/2014 | Kwon | H04W 52/0219 370/336 |
| 2014/0112280 A1* | 4/2014 | Lee | H04W 72/04 370/329 |
| 2014/0219152 A1* | 8/2014 | Ant | H04W 52/08 370/311 |
| 2014/0334395 A1* | 11/2014 | Lee | H04L 5/0053 370/329 |

OTHER PUBLICATIONS

Written Opinion of International Searching Authority dated Oct. 16, 2013 in connection with International Patent Application No. PCT/KR2013/005761, 4 pages.

* cited by examiner

METHODS AND APPARATUS FOR UPLINK CONTROL CHANNEL MULTIPLEXING IN BEAMFORMED CELLULAR SYSTEMS

CROSS-REFERENCE TO RELATED APPLICATION(S) AND CLAIM OF PRIORITY

The present application claims priority to U.S. Provisional Patent Application Ser. No. 61/666,615, filed Jun. 29, 2012, entitled "METHODS AND APPARATUS FOR UPLINK CONTROL CHANNEL MULTIPLEXING IN MILLIMETER WAVE CELLULAR SYSTEMS". The content of the above-identified patent documents is incorporated herein by reference.

TECHNICAL FIELD

The present application relates generally to cellular systems and, more specifically, to beamformed cellular systems.

BACKGROUND

Mobile communication has been one of the most successful innovations in modern history. In recent years, the number of subscribers to mobile communication services has exceeded five billion and is growing fast. At the same time, new mobile communication technologies have been developed to satisfy the increasing needs and to provide more and better mobile communication applications and services. Some examples of such systems are cdma2000 1xEV-DO systems developed by 3GPP2, WCDMA, HSPA, and LTE systems developed by 3GPP, and mobile WiMAX systems developed by IEEE. As more and more people become users of mobile communication systems, and more and more services are provided over these systems, there is an increasing need of a mobile communication system with larger capacity, higher throughput, lower latency, and better reliability.

Millimeter waves often refer to radio waves with wavelength in the range of 1 mm-10 mm, which corresponds to radio frequency of 30 GHz-300 GHz. These radio waves exhibit unique propagation characteristics. For example, compared with lower frequency radio waves, millimeter waves have higher propagation loss, have less ability to penetrate objects—such as buildings, walls, foliage, and the like—and are more susceptible to atmospheric absorption, deflection, and diffraction due to particles (e.g., rain drops) in the air.

Alternatively, due to their shorter wave lengths, more antennas can be packed in a relatively small area, enabling high-gain antenna in a small form factor. In addition, these radio waves have been less utilized than the lower frequency radio waves. This also presents unique opportunities for new businesses to acquire the spectrum in this band at a lower cost. The International Telecommunications Union (ITU) defines frequencies in 3 GHz-30 GHz as SHF (Super High Frequency). Note that some higher frequencies in the SHF band also exhibit similar behavior as radio waves in the EHF band (i.e., millimeter waves), such as large propagation loss and the possibility of implementing high-gain antennas in small form factors.

SUMMARY

A method of a base station (BS) that communicates with a user equipment (UE) via one or more directional beams is provided. The method includes sending a timing advance (TA) to the UE. The method includes receiving information from the UE via a receive beam of the one or more directional beams of the BS and via an uplink (UL) control region of an UL control channel. The UL control region of the UL control channel is identified via the TA and the receive beam.

A base station (BS) that communicates with a user equipment (UE) via one or more directional beams is provided. The BS includes one or more processors configured to send a timing advance (TA) to the UE. The one or more processors are configured to receive information from the UE via a receive beam of the one or more directional beams of the BS and via an uplink (UL) control region of an UL control channel. The UL control region of the UL control channel identified via the TA and the receive beam.

A user equipment (UE) that communicates with a base station (ES) using one or more directional beams is provided. The UE includes one or more processors configured to receive a timing advance (TA) from the BS. The one or more processors are configured to send information to the BS via a receive beam of the one or more directional beams of the BS and via an uplink (UL) control region of an UL control channel. The UL control region of the UL control channel is identified via the TA and the receive beam.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged cellular system.

Figure 1:
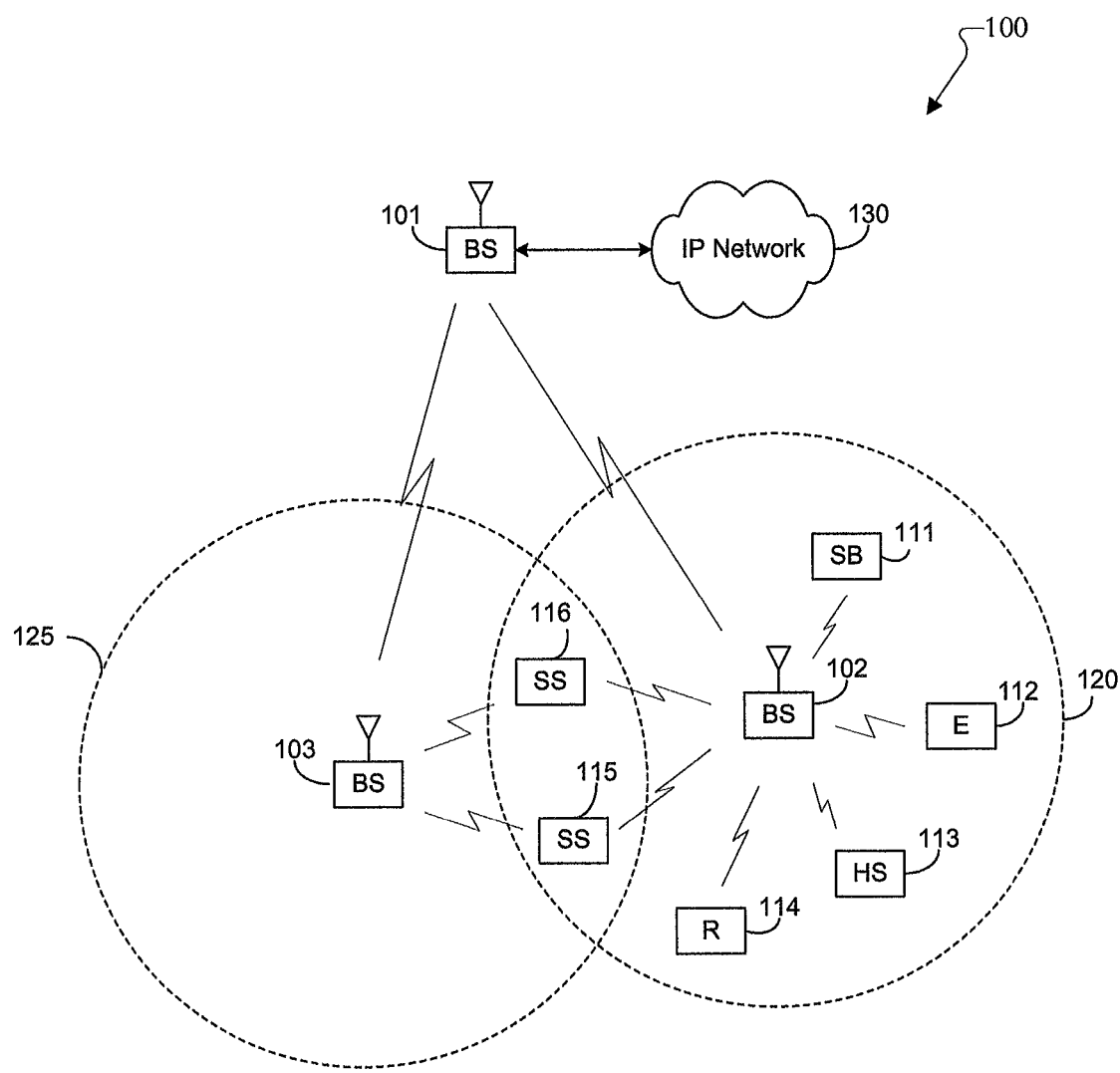
FIG. 1 illustrates a wireless network according to embodiments of the present disclosure.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes base station (BS) 101, BS 102, and BS 103. BS 101 communicates with BS 102 and BS 103. BS 101 also communicates with Internet protocol (IP) network 130, such as the Internet, a proprietary IP network, or other data network.

Depending on the network type, other well-known terms may be used instead of "base station," such as "eNodeB" (eNB) or "access point" (AP). For the sake of convenience, the term "base station" (BS) shall be used herein to refer to the network infrastructure components that provide wireless access to remote terminals. In addition, the term user equipment (UE) is used herein to refer to remote terminals that can be used by a consumer to access services via the wireless communications network via that wirelessly access an BS, whether the UE is a mobile device (e.g., cell phone) or is normally considered a stationary device (e.g., desktop personal computer, vending machine, etc.). In other systems, other well-known terms may be used instead of "user equipment", such as "mobile station" (MS), "subscriber station" (SS), "remote terminal" (RT), "wireless terminal" (WT), and the like.

BS 102 provides wireless broadband access to network 130 to a first plurality of user equipments (UEs) within coverage area 120 of BS 102. The first plurality of UEs includes UE 111, which may be located in a small business; UE 112, which may be located in an enterprise; UE 113, which may be located in a WiFi hotspot; UE 114, which may be located in a first residence; UE 115, which may be located in a second residence; and UE 116, which may be a mobile device, such as a cell phone, a wireless laptop, a wireless PDA, or the like. UEs 111-116 may be any wireless communication device, such as, but not limited to, a mobile phone, mobile PDA and any mobile station (MS).

BS 103 provides wireless broadband access to a second plurality of UEs within coverage area 125 of BS 103. The second plurality of UEs includes UE 115 and UE 116. In some embodiments, one or more of BSs 101-103 may communicate with each other and with UEs 111-116 using techniques in accordance with standards for wireless communication, which include techniques for: uplink control channel multiplexing in beamformed cellular systems as described in embodiments of the present disclosure.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace BSs 101-103 and UEs 111-116. Wired connections may replace the wireless connections depicted in FIG. 1.

Figure 2A:
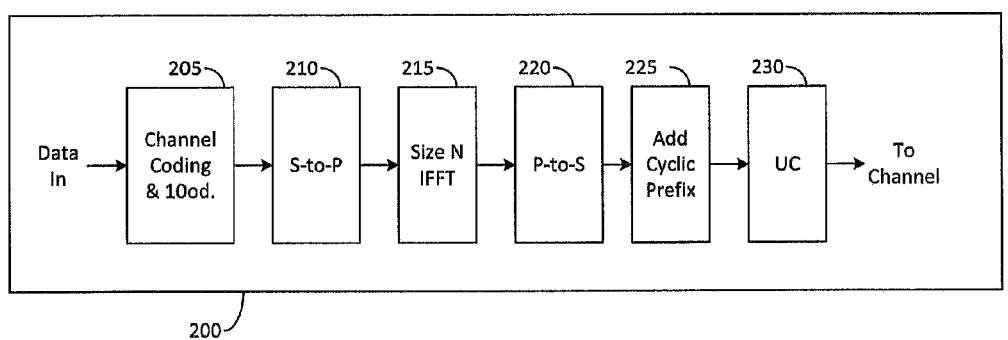
FIG. 2A illustrates a high-level diagram of a wireless transmit path according to embodiments of the present disclosure.
Figure 2B:
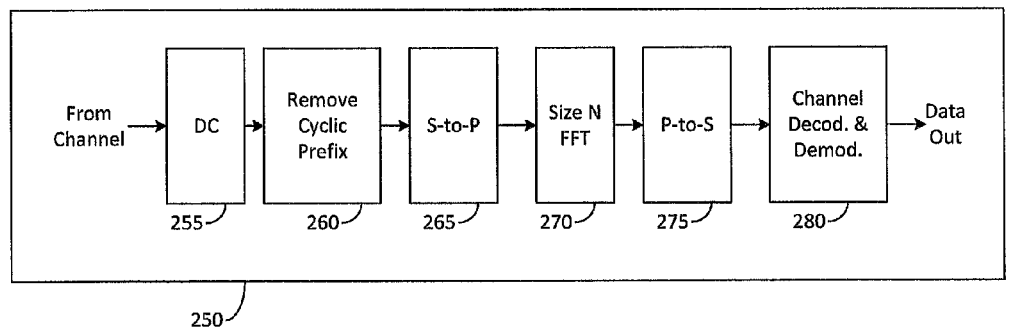
FIG. 2B illustrates a high-level diagram of a wireless receive path according to embodiments of the present disclosure.

FIG. 2A is a high-level diagram of a wireless transmit path. FIG. 2B is a high-level diagram of a wireless receive path. The embodiments of FIGS. 2A and 2B are for illustration only. Other embodiments could be used without departing from the scope of this disclosure.

In FIGS. 2A and 2B, the transmit path 200 may be implemented, e.g., in BS 102 and the receive path 250 may be implemented, e.g., in a UE, such as UE 116 of FIG. 1. It will be understood, however, that the receive path 250 could be implemented in a BS (e.g., BS 102 of FIG. 1) and the transmit path 200 could be implemented in a UE. In certain embodiments, transmit path 200 and receive path 250 are configured to perform methods for uplink control channel multiplexing in beamformed cellular systems as described in embodiments of the present disclosure.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2A and 2B may be implemented in software while other components may be implemented by configurable hardware (e.g., one or more processors) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at the receiver after passing through the wireless channel and reverse operations to those at the transmitter are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of BSs 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to BSs 101-103 and may implement a receive path corresponding to the architecture for receiving in the downlink from BSs 101-103.

Figure 3:
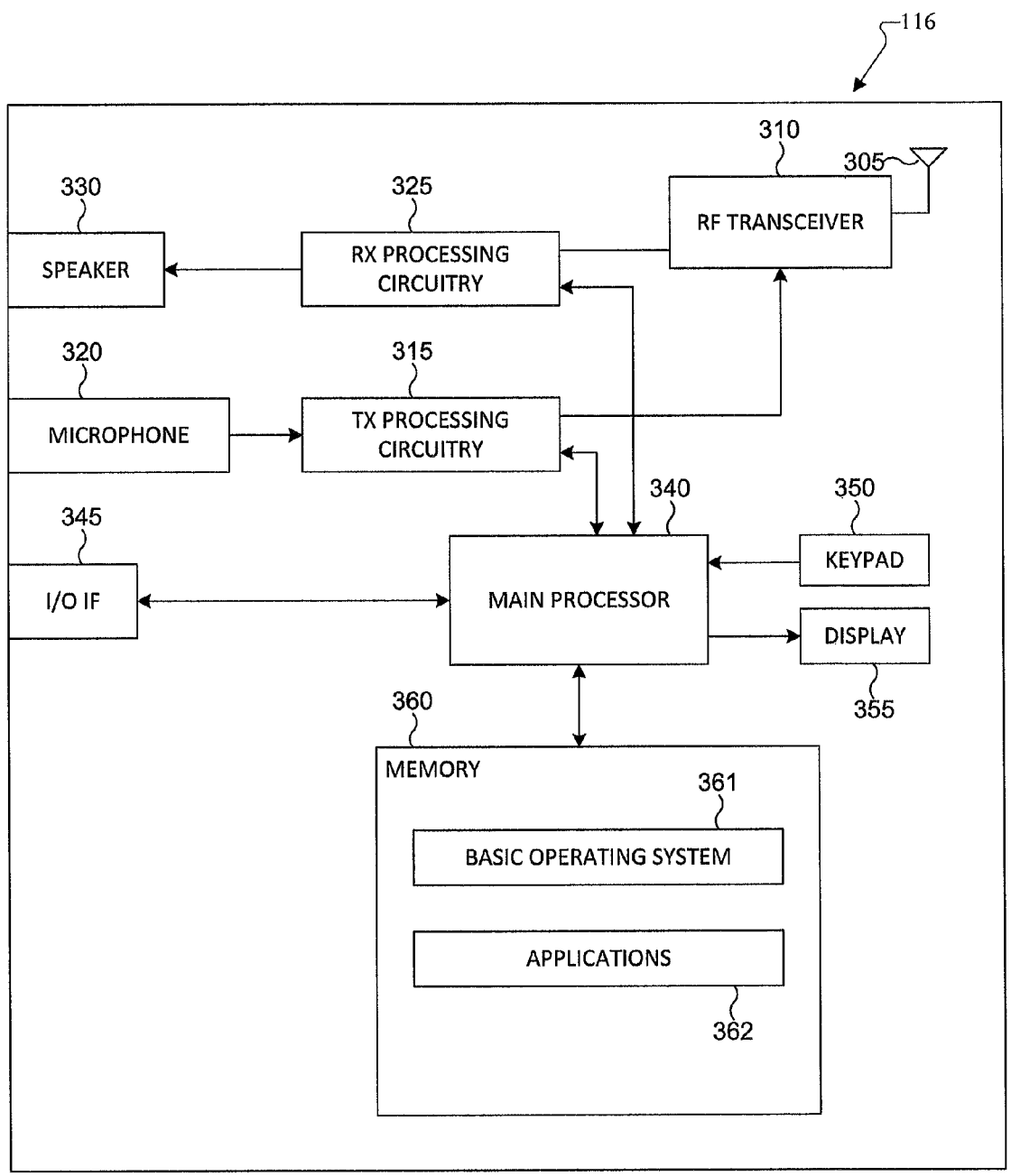
FIG. 3 illustrates a subscriber station according to embodiments of the present disclosure.

FIG. 3 illustrates a subscriber station according to embodiments of the present disclosure. The embodiment of subscriber station, such as UE 116, illustrated in FIG. 3 is for illustration only. Other embodiments of the wireless subscriber station could be used without departing from the scope of this disclosure.

UE 116 comprises antenna 305, radio frequency (RF) transceiver 310, transmit (TX) processing circuitry 315, microphone 320, and receive (RX) processing circuitry 325. UE 116 also comprises speaker 330, main processor 340, input/output (I/O) interface (IF) 345, keypad 350, display 355, and memory 360. Memory 360 further comprises basic operating system (OS) program 361 and a plurality of applications 362.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In certain embodiments, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 can be comprised of one or more processors and executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for uplink control channel multiplexing in beamformed cellular systems as described in embodiments of the present disclosure. Main processor 340 can move data into or out of memory 360, as required by an executing process. In some embodiments, the main processor 340 is configured to execute a plurality of applications 362, such as applications for CoMP communications and MU-MIMO communications, including uplink control channel multiplexing in beamformed cellular systems. Main processor 340 can operate the plurality of applications 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of UE 116 uses keypad 350 to enter data into UE 116. Display 355 may be a liquid crystal display capable of rendering text and/or at least limited graphics from web sites. Alternate embodiments may use other types of displays.

Figure 4:
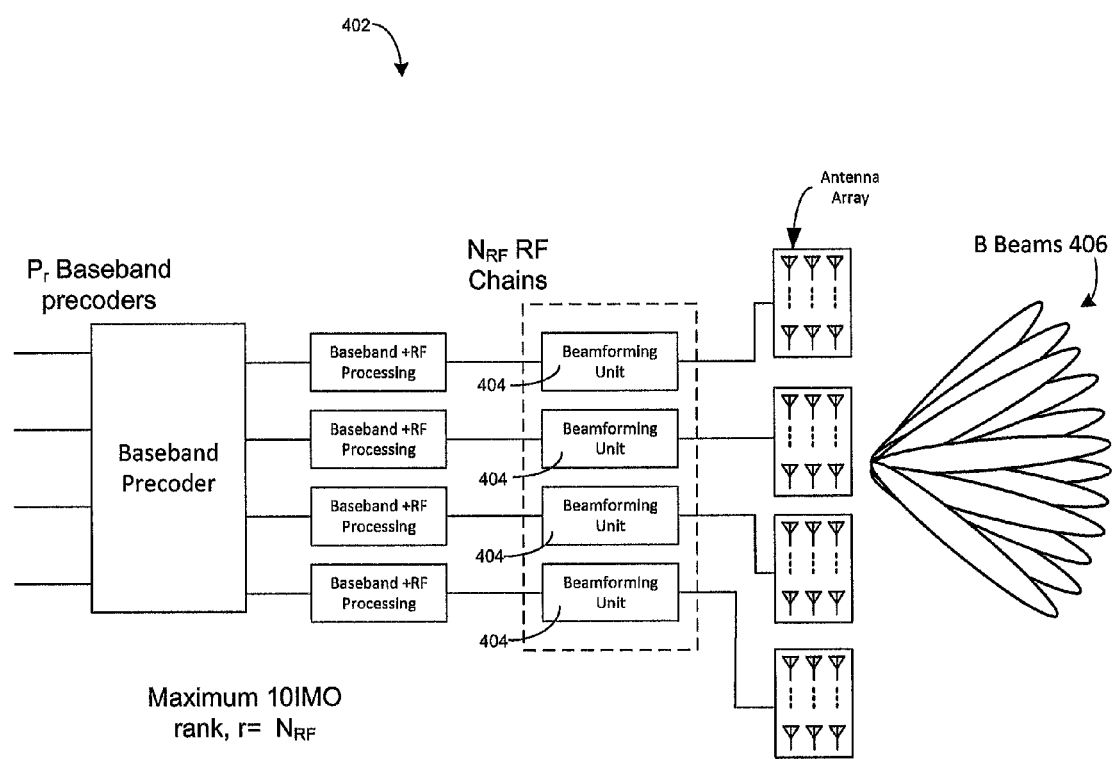
FIG. 4 illustrates a transceiver according to embodiments of the present disclosure.

FIG. 4 illustrates a transceiver according to embodiments of the present disclosure. The embodiment of the transceiver shown in FIG. 4 is for illustration only. Other embodiments could be used without departing from the scope of this disclosure.

Beamforming is expected to be a mainstay of a millimeter wave communication system and indicates the directive nature of transmission for both control and data. Directivity depends, among other things, on: the location of UE 116 vis-A-vis BS 102, the amount of shadowing, and the presence of reflectors in a vicinity of BS 102 and UE 116. The present disclosure considers an OFDM transceiver 402 comprised by each of BS 102 and UE 116. OFDM transceiver 402 has RF beamforming units 404 capable of supporting spatial directions using B beams 406 as shown in the example in FIG. 4. UE 116 tunes its beamforming unit using a specific beam to a spatial direction that maximizes the received power from BS 102 and BS 102 tunes its beamforming unit using a specific beam that maximizes the received power at UE 116. UE 116 and BS 102 each use both transmit and receive beamforming training to set a preferred beam and its direction for transmission or reception.

While this disclosure is illustrated in the context of communication with millimeter waves, embodiments of the present disclosure are applicable to other communication mediums, such as radio waves with a frequency of 10 GHz-30 GHz that exhibit properties similar to those of millimeter waves. In some cases, the embodiments of the present disclosure are also applicable to electromagnetic waves with terahertz frequencies, infrared, visible light, and other optical media. For illustrative purposes, the term "cellular band" and "millimeter wave band" are used where "cellular band" refers to frequencies around a few hundred megahertz to a few gigahertz and "millimeter wave band" refers to frequencies around a few tens of gigahertz to a few hundred gigahertz. A distinction between these bands is that radio waves in cellular bands have less propagation loss and can be better used for coverage purpose, but may require large antennas, and radio waves in millimeter wave bands can have higher propagation loss, but lend themselves well to high-gain antennas and antenna array designs in a small form factor.

Figure 5:
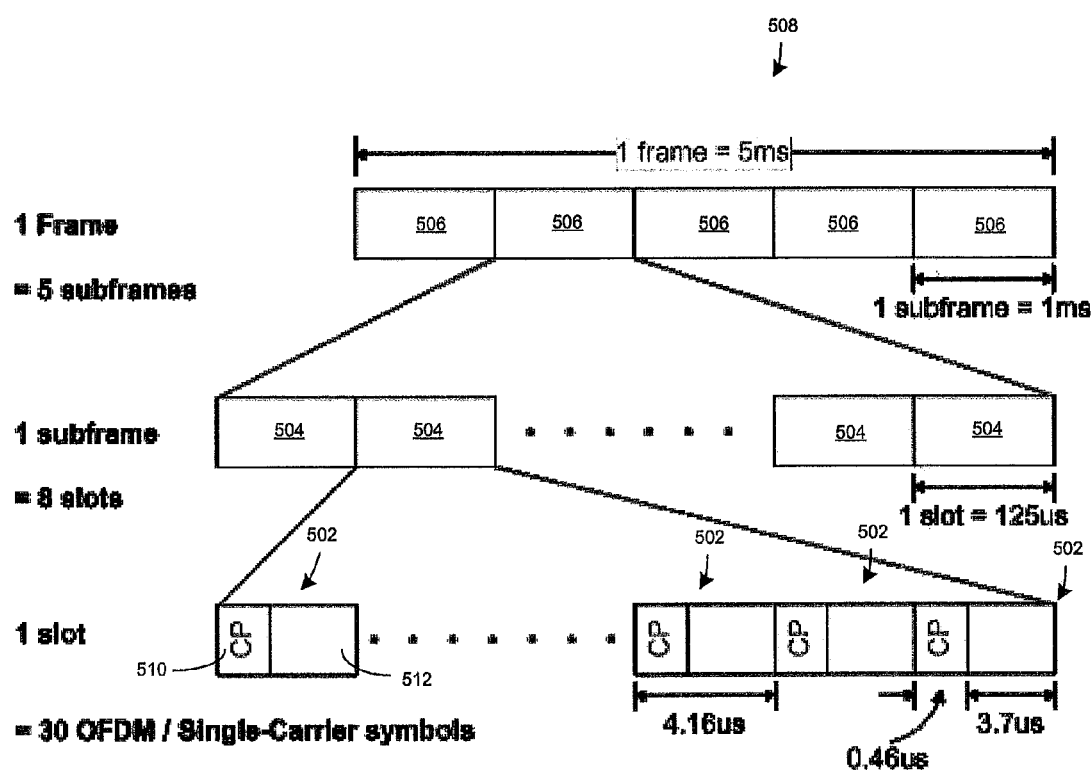
FIG. 5 illustrates a frame structure of a 5G system according to embodiments of the present disclosure.

FIG. 5 illustrates a frame structure for a millimeter wave cellular system according to embodiments of the present disclosure. The embodiment of the frame structure shown in FIG. 5 is for illustration only. Other embodiments could be used without departing from the scope of this disclosure.

OFDM symbols 502 are grouped into slots 504 for scheduling granularity. For example, 30 OFDM symbols 502 can form a slot in a 5G system, with each symbol 502 comprising a cyclic prefix 510 and a payload 512. Eight slots can form a subframe 504 and five subframes can form a frame 508. The different granularities, such as symbol 502, slot 504, subframe 506 and frame 508 illustrate the granularity for transmitting data and control over the wireless medium. Each OFDM symbol 502 can be 4.16 us long with a 0.46 us cyclic prefix 510 and 3.7 us payload. Slot 504 can be made of 30 OFDM symbols and be 125 us long. Subframe 506 can be 1 ms long and frame 508 can be 5 ms long. The groupings and durations of cyclic prefixes 510, payloads 512, symbols 502, slots 504, subframes 506, and frames 508 can vary as desired.

Communication from BS 102 to UE 116 is called downlink (DL) communication while communication from UE 116 to BS 102 is called uplink (UL) communication. UE 116 is allocated a set of subcarriers based on a complex scheduling algorithm taking into account one or more of: demand from UE 116, overall demand from other SSs, fairness, and quality of service constraints. The subcarrier allocation can change dynamically over time. DL and UL communications can be separated in either or both of a frequency domain and a time domain.

Figure 6:
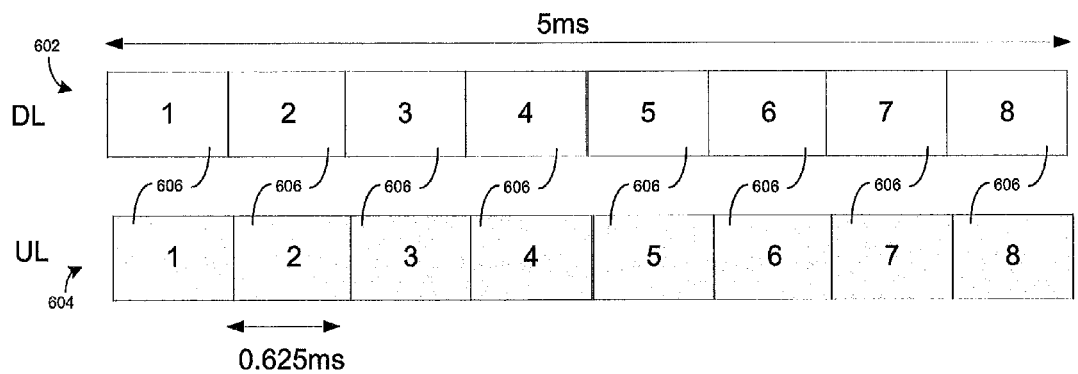
FIG. 6 illustrates frequency division duplexing according to embodiments of the present disclosure.

FIG. 6 illustrates frequency division duplexing according to embodiments of the present disclosure. The embodiment of frequency division duplexing shown in FIG. 6 is for illustration only. Other embodiments could be used without departing from the scope of this disclosure.

If downlink and uplink separation is enforced in the frequency domain, then the system is a frequency division duplex (FDD) system. In an FDD system, the downlink (DL) 602 and uplink (UL) 604 transmissions occur simultaneously on different frequency bands. The transmission is divided in time into time intervals, such as slots 606.

Figure 7:
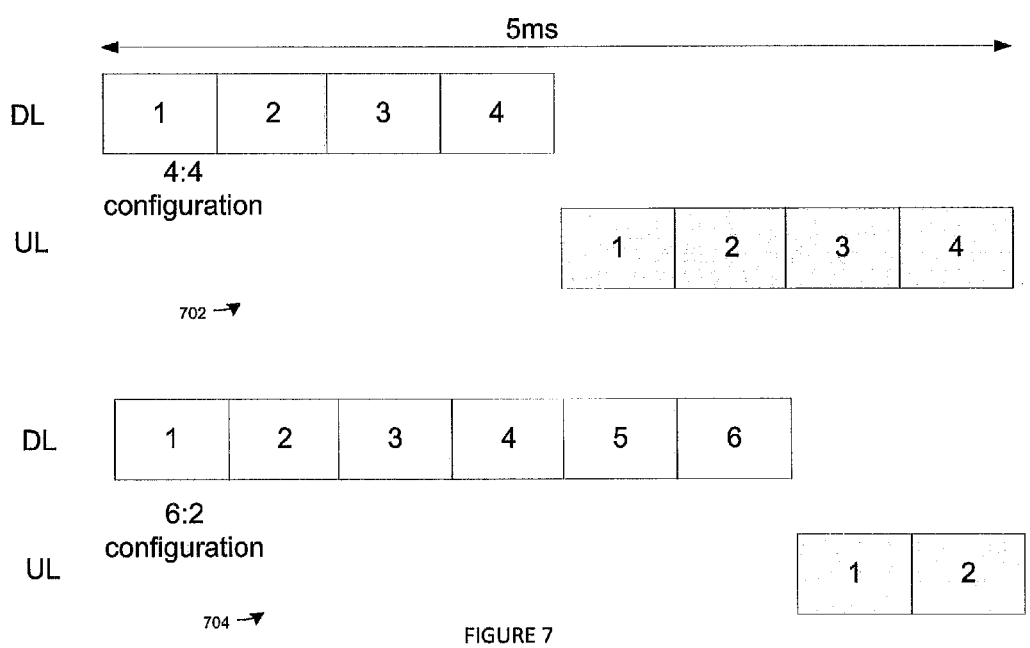
FIG. 7 illustrates time division duplexing according to embodiments of the present disclosure.

FIG. 7 illustrates time division duplexing according to embodiments of the present disclosure. The embodiment of time division duplexing shown in FIG. 7 is for illustration only. Other embodiments could be used without departing from the scope of this disclosure.

Systems where uplink and downlink transmissions are separated in time are referenced as time division duplex (TDD) systems. In a TDD system a single frequency band is used for uplink and downlink transmission. The transmission time can be shared between downlink and uplink in different proportions. One configuration can be as 4:4 configuration 702 with four subframes in a frame used for downlink communication and four subframes for uplink communication. Another configuration can be as 6:2 configuration 704 with two subframes for downlink communication and six subframes for uplink communication.

An advantage of TDD systems is that uplink and downlink channels are symmetric, which allows for downlink channel quality and channel estimation at the base station from uplink transmissions. In an FDD system, UE 116 calculates channel quality and information from downlink pilot transmissions, which are fed back to BS 102 on a feedback channel.

Embodiments of the present disclosure can use both TDD and FDD systems. In cellular mobile communication systems employing multiple access techniques (such as orthogonal frequency division multiple access (OFDMA) in Third Generation Partnership Project (3GPP) Long Term Evolution (LTE)/LTE-Advanced (LTE-A)), it is essential that, when different mobile stations transmit data on the uplink channel (UE 116 to BS 102), the transmissions are synchronized to ensure that data from different SSs is received by BS 102 in a time synchronized manner. This maintains orthogonality between the different subscriber stations multiplexed across different frequencies, and also avoids potential collisions between SSs transmitting at different time instants. It is noted that for OFDMA systems, absolute timing synchronization is not mandatory, as long as the timing offset fulls within the cyclic prefix (CP) duration.

The need for ensuring synchronization on the uplink transmission arises, because different SSs have different locations relative to the BS, and hence the data transmitted by the different subscriber stations undergo different propagation delays. As an example, a first UE, UE 116, and a second UE, UE 115, transmit to BS 102. UE 116 is located closer to BS 102 than UE 115 so that data from UE 116 undergoes a smaller propagation delay, and hence, without any timing adjustments, is expected to be received at BS 102 before data from UE 115 reaches BS 102. A practical approach to ensure uplink timing synchronization is that, each UE adjusts its timing before transmitting data to BS 102. This is referred to as timing advance (TA).

BS 102 advises UE 116 on an appropriate TA that UE 116 should employ. Initially (e.g., upon network entry, or upon waking up from the sleep mode, or when UE 116 performs handoff from one cell to another), UE 116 acquires downlink timing synchronization using the synchronization and broadcast channels (primary synchronization channel, secondary synchronization channel, broadcast channel, PSCH/SSCH/BCH).

Subsequently, UE 116 acquires system specific information, including information on parameters for randomly accessing the uplink channel, and then, performs the random access preamble transmission on the uplink channel. The timing of the random access preamble sequence received by BS 102 allows BS 102 to estimate the appropriate timing advance that UE 116 must employ before uplink transmission.

BS 102 sends a random access response, indicating the successfully received preamble and a corresponding TA value. UE 116 receives this response from BS 102, and, if the preamble number in the response matches the one used by UE 116 for its transmission, UE 116 determines that its preamble transmission was successful, and uses the received TA value for future uplink transmission. Note that when the UE first performs the random access preamble transmission, it is not synchronized on the uplink, and hence a guard time is added to avoid collisions with other transmissions.

In an mmwave mobile broadband (MMB) communication system, BS 102 and UE 116 communicate using directional beams. For instance, BS 102 can pick one (or more) of the several possible directions in which it can beamform, and similarly, UE 116 can pick one (or more) of the several directions in which it can beamform. In other words, the uplink communication can be performed using any particular combination of UE beam direction and BS beam direction.

Figure 8:
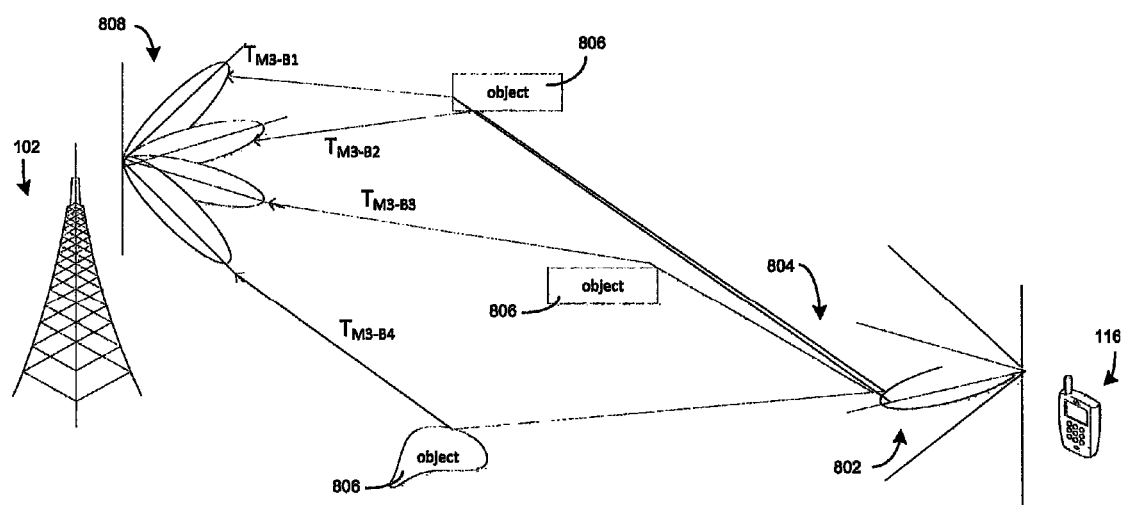
FIG. 8 illustrates different time delays for a UE transmit beam and multiple BS receive beams according to embodiments of the present disclosure.

FIG. 8 illustrates different time delays for an UE transmit beam and multiple BS receive beams according to embodiments of the present disclosure. The embodiment shown in FIG. 8 is for illustration only. Other embodiments could be used without departing from the scope of this disclosure.

UE 116 transmits on beam 802. Objects 806 interfere with signals 804 transmitted via beam 804. The interference from objects 806 causes signals 804 from the single transmit beam 802 to be received by each of four different receive beams 808 at BS 102. The path length for each of the signals 804 can be different such that each of the signals 804 is received at BS 102 at different times, which if not received within the duration of the cyclic prefix can interfere with other transmissions of UE 116 and with transmissions of other SSs communicating with BS 102.

UE 116 and BS 102 can both have knowledge of the timing advances required on different transmit-receive beam pairs. UE 116 computes the timing advances (TAs) required on different transmit-receive beam pair using the timing advance for one transmit-receive beam pair indicated by BS 102. BS 102 can acquire TAs for different transmit-receive beam pairs for the UE 116 in numerous ways. In one way, BS 102 uses a sounding reference symbol (SRS) to estimate TAs for different beam pairs. Additionally, BS 102 can ask UE 116 to transmit differential TAs for all transmit receive beam pairs where the differential is with respect to the TA transmitted to UE 116 for uplink transmission.

Depending on current channel conditions and a best transmit-receive strategy to maximize Signal Interference Noise Ratio (SINR) for a transmission from UE 116, BS 102 assigns a particular timing advance and a transmission mode to UE 116. At a system level, this allocation of a transmission mode and timing advance to UE 116 and to each other UE connected to BS 102 allows BS 102 to categorize each of the subscriber stations into different sets or groups of SSs with a similar receive strategy. This set can indicate a common receive beam used by the BS to receive uplink transmission from a group of SSs.

In cellular communications, there are numerous types of uplink control channels like ranging, sounding, CQI feedback and ACK/NACK channels all of which are used for different purposes. The issue of timing advance difference between different receive beams leading to interference can affect all the uplink control channels and in particular the CQI feedback and ACK/NACK channels that have tighter and different multiplexing constraints than a ranging or a sounding channel. However, embodiments of the present disclosure use the term uplink control channel in the most general sense to be applicable individually to each of the uplink control channels and cumulatively to a group of uplink control channels multiplexed together. An uplink control region is a set of resources identified by a frequency, time and space used by the MS to transmit the uplink control channels to the BS.

Figure 9:
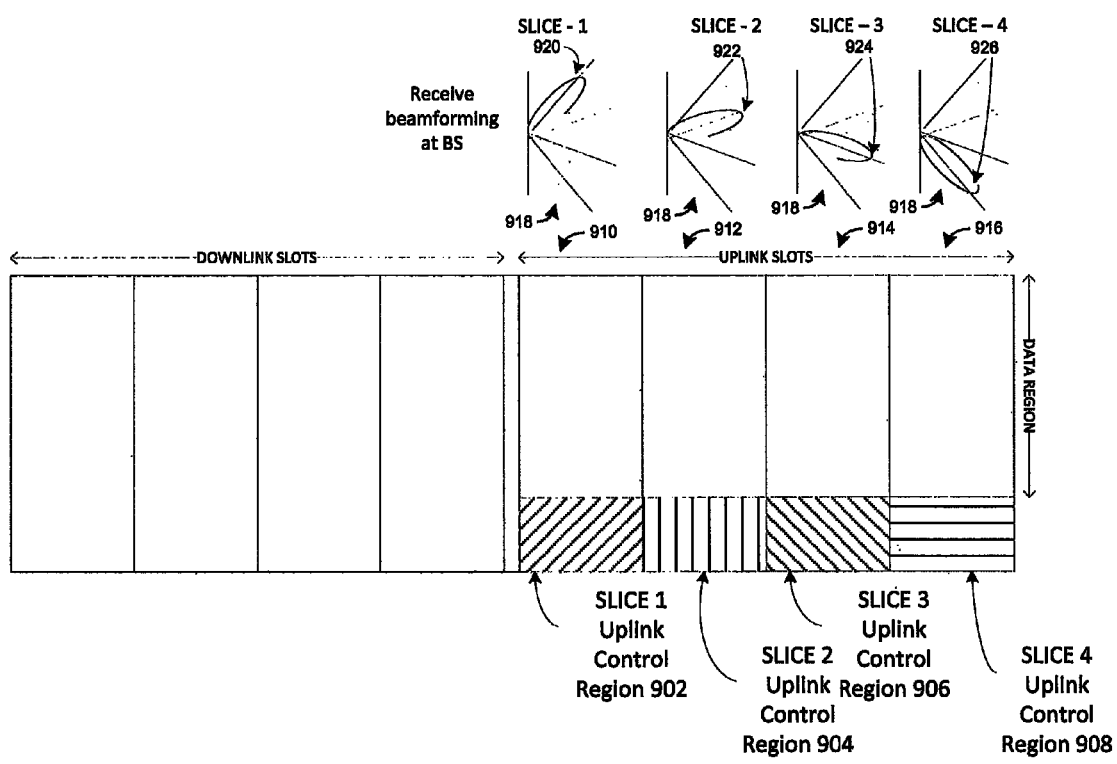
FIG. 9 illustrates slice level time division multiplexing of an uplink control channel according to embodiments of the present disclosure.

FIG. 9 illustrates slice level time division multiplexing of an uplink control channel according to embodiments of the present disclosure. The embodiment shown in FIG. 9 is for illustration only. Other embodiments could be used without departing from the scope of this disclosure.

Uplink control regions 902-908 (also referred to as resource regions) of one or more uplink control channels are linked to a choice of the uplink timing advance that UE 116 uses for its transmission to BS 102. Uplink control regions 902-908 are partitioned for different sets based on receive beamforming capability of BS 102. The sets each comprise one of receive beams 920-926 used by BS 102. Uplink control regions 902-908 can be assigned to respective uplink slots 910-916. The resources of the uplink control channel for the different sets are separated in time. BS 102 computes a preferred one of receive beams 920-926 for data transmitted by UE 116 using procedures such as ranging, and so forth. A timing advance for UE 116 to use when transmitting its data to BS 102 is also indicated. Since the timing advance is related to one of receive beams 920-926 that BS 102 will use to receive the information from UE 116, UE 116 uses the timing advance and the one of the receive beams 920-926 used by BS 102 to compute an uplink slot where a control channel associated with the BS receive beam is to be transmitted. An illustration for the receive beam based multiplexing is shown in FIG. 9 where each receive beam 920-926 is identified using a slice identification (ID) and the different uplink control regions 902-908 that are associated with the different slices are separated in time over the different uplink slots 910-916. A slice is defined as a receive beam at the BS or a group of receive beams at the BS that have all been indexed by an ID known as the slice ID.

In certain embodiments, uplink control regions 902-908 that are associated with respective receive beams 920-926 at BS 102 are multiplexed implicitly without an uplink control channel configuration message from BS 102. UE 116 can use a mapping function that uses a current sub-frame configuration and an uplink receive beam configuration to identify one of uplink slots 910-916 on which to multiplex uplink control channels for one of receive beams 920-926 within a given sub-frame. An example is illustrated in FIG. 9 where first receive beam 920 corresponding to SLICE 1 is multiplexed onto first uplink slot 910, second receive beam 922 corresponding to SLICE 2 is multiplexed onto second uplink slot 912, third receive beam 918 corresponding to SLICE 3 is multiplexed onto third uplink slot 914, and fourth receive beam 926 corresponding to SLICE 4 is multiplexed onto fourth uplink slot 916. First control region 902 of slot 910 is identified via a first receive beam 920, second control region 904 of slot 912 is identified via a second receive beam 922, third control region 906 of slot 914 is identified via a third receive beam 924, and fourth control region 908 of slot 916 is identified via a fourth receive beam 926.

In certain embodiments, UE 116 uses a downlink control channel allocation message (e.g., via a physical downlink control channel (PDCCH)) that one of: (1) explicitly allocates an uplink control channel; and (2) implicitly maps a downlink data grant to an uplink control channel to identify the resource regions for the uplink control channel from among a plurality of uplink control channels in a slot for a receive beam of BS 102.

Figure 10:
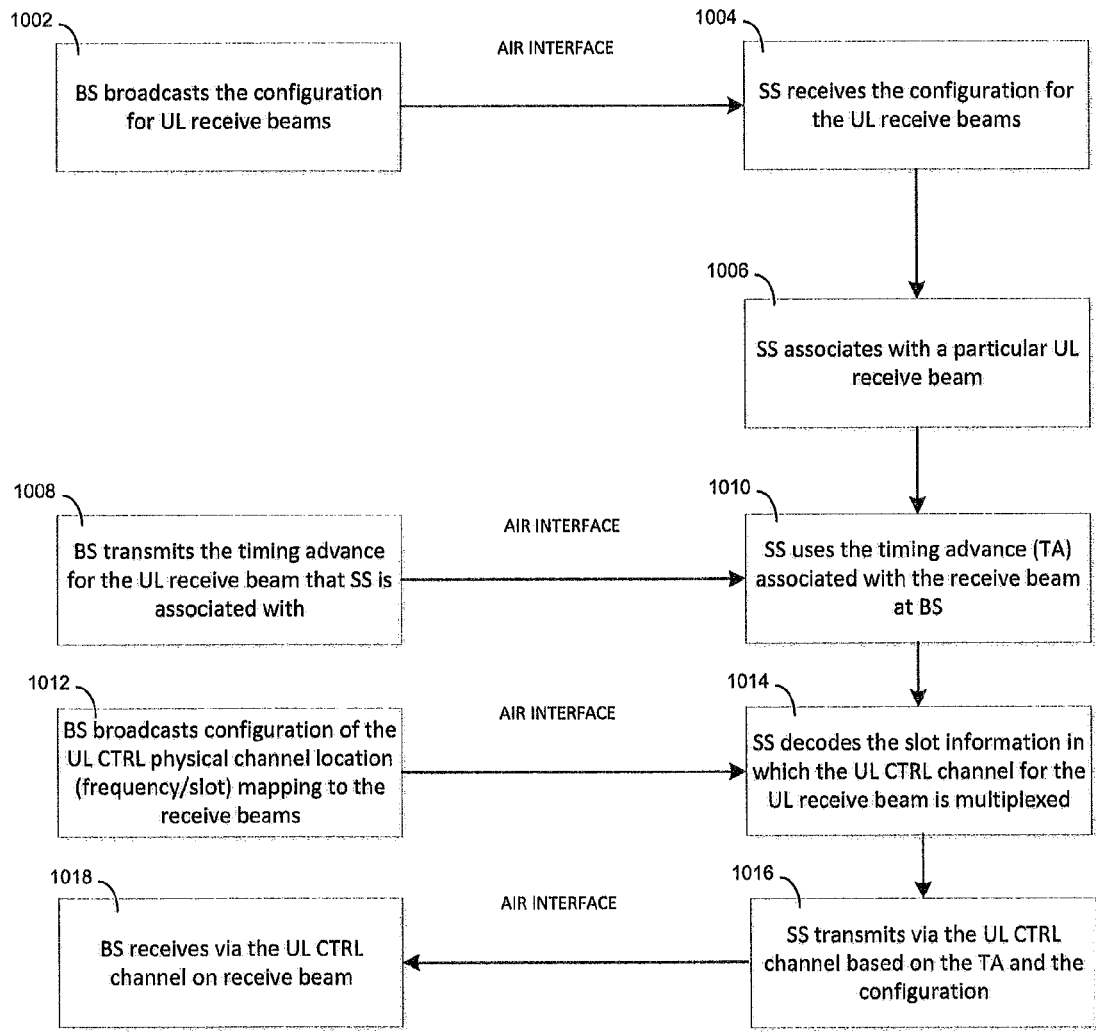
FIG. 10 is a flow diagram illustrating configuration and association rules for UL control channel multiplexing based on UL receive beams according to embodiments of the present disclosure.

FIG. 10 is a flow diagram illustrating configuration and association rules for UL control channel multiplexing based on UL receive beams according to embodiments of the present disclosure. While the flowchart depicts a series of sequential steps, unless explicitly stated, no inference should be drawn from that sequence regarding specific order of performance of steps, or portions thereof, serially rather than concurrently or in an overlapping manner, or performance the steps depicted exclusively without the occurrence of intervening or intermediate steps. The process depicted in the example is implemented by one or more transmit chains or receive chains at one or more BSs or UEs, such as BS 102 and UE 116. BS 102 and UE 116 can each comprise one or more digital or analog processors configured to perform one or more steps depicted in the flow diagram of FIG. 10.

In certain embodiments, an explicit configuration message that describes or identifies one or more slots onto which one or more uplink control channel regions are multiplexed is transmitted by BS 102 to UE 116. This allows BS 102 to manage communication loads on its different receive beams and freely allocate various slots on which the uplink control channels are multiplexed. A message flow diagram for UE 116 to identify an uplink control channel configuration that describes one or more slots in which one or more uplink control channels are multiplexed is shown in FIG. 10. For UE 116 to successfully identify or decode a slot of an uplink control channel, several messages can be used.

At 1002, BS 102 broadcasts a message identifying one or more configurations for its uplink receive beams to UE 116. Each receive beam can have its own configuration. At 1004, UE 116 receives the one or more configurations of the uplink receive beams from BS 102.

At 1006, UE 116 associates with a particular receive beam of BS 102. The association is based on the one or more configurations received from BS 102.

At 1008, BS 102 transmits a timing advance for the uplink receive beam that UE 116 is associated with. At 1010, UE 116 uses the timing advance associated with the associated receive beam to communicate with BS 102.

At 1012, BS 102 broadcasts configuration of the uplink control physical channel location mapping to the receive beams. At 1014, UE 116 identifies the uplink slot where the uplink control channel for the receive beam is multiplexed. The identifying of the slot also can be referred to as decoding the slot information in which the uplink control channel for the uplink receive beam is multiplexed.

At 1016, UE 116 transmits on the uplink control channel based on the timing advance (TA) and configuration received from the BS 102. The slot, on which UE 116 transmits, is determined based on the timing advance and configuration received from BS 102 that can be used to identify a receive beam of BS 102. An UL control region of the UL control channel is identified via the TA and the receive beam of BS 102.

At 1018, BS 102 receives information from UE 116 via the uplink control channel. The information is received on a receive beam of BS 102 that is associated with UE 116 and identified via the TA.

Figure 11:
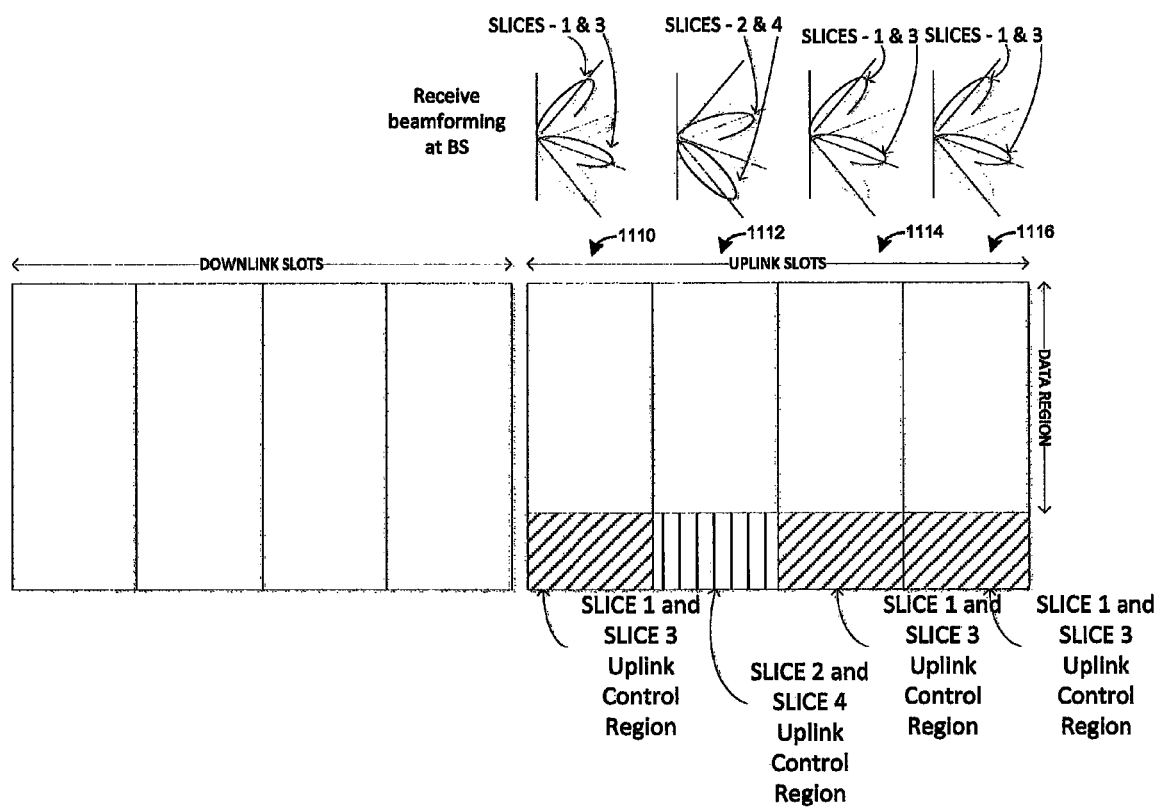
FIG. 11 illustrates multiplexed uplink control regions associated with multiple receive beams or slices according to embodiments of the present disclosure.

FIG. 11 illustrates multiplexed uplink control regions associated with multiple receive beams or slices according to embodiments of the present disclosure. The embodiment shown in FIG. 11 is for illustration only. Other embodiments could be used without departing from the scope of this disclosure.

BS 102 can multiplex the uplink control channels for one or more receive beams on a same uplink slot. BS 102 can use different resource elements for the control channels associated with different receive beams in the same slot. If the BS makes the determination to multiplex the uplink control channels on the same uplink slot but separated in resource elements, then such an allocation can be similar to the illustration in FIG. 11 where the uplink control channels for receive beams identified via SLICE 1 and SLICE 3 are multiplexed on uplink slots 1110, 1114, and 1116 while the control channels for receive beams identified via SLICE 2 and SLICE 4 are multiplexed on uplink slot 1112. Put another way, uplink control regions corresponding to multiple receive beams can be multiplexed on a same UL slot.

Figure 12:
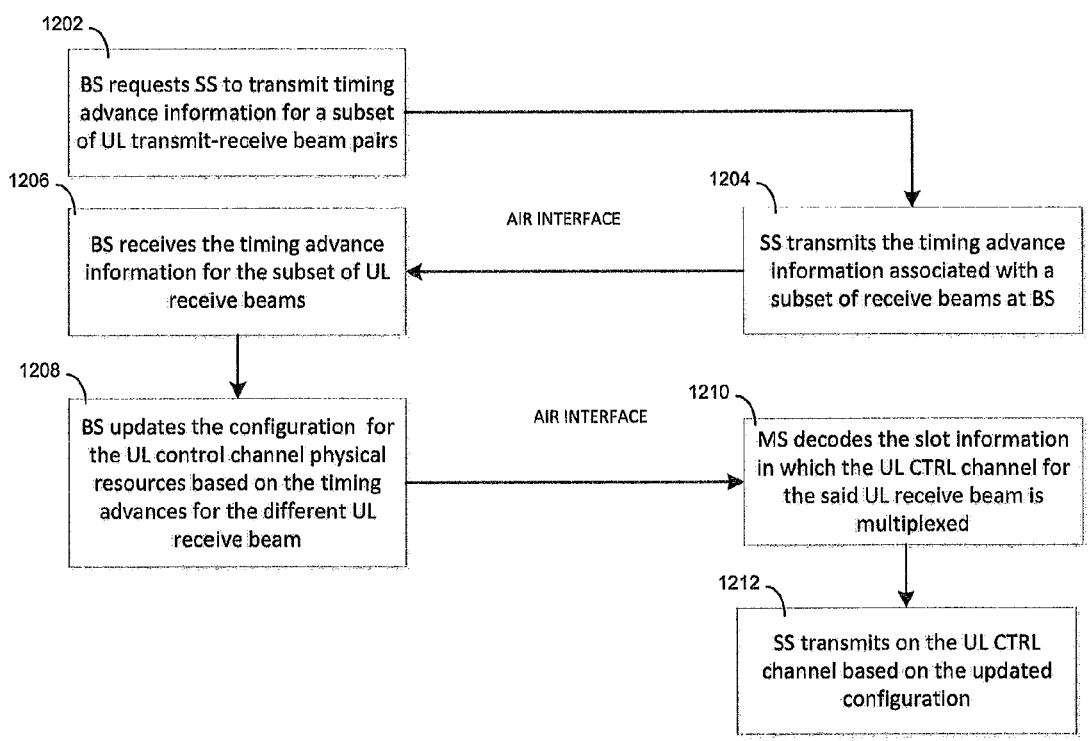
FIG. 12 is a flow diagram illustrating an update procedure for configuration of UL control channel multiplexing based on timing advances for a subset of receive beams according to embodiments of the present disclosure.

FIG. 12 is a flow diagram illustrating an update procedure for configuration of UL control channel multiplexing based on timing advances for a subset of receive beams according to embodiments of the present disclosure. While the flowchart depicts a series of sequential steps, unless explicitly stated, no inference should be drawn from that sequence regarding specific order of performance of steps, or portions thereof, serially rather than concurrently or in an overlapping manner, or performance of the steps depicted exclusively without the occurrence of intervening or intermediate steps. The process depicted in the example is implemented by a transmitter chain, for example, a base station. BS 102 and UE 116 can each comprise one or more digital or analog processors configured to perform the steps depicted in the flow diagram of FIG. 12.

In certain embodiments, BS 102 uses the knowledge of timing advances of the different transmit-receive beam pairs from multiple SSs under its coverage to decide which receive beams can be multiplexed in a same uplink slot, as described in relation to FIG. 11. If BS 102 does not have knowledge of the timing advances for multiple transmit-receive beam pairs, BS 102 requests, at 1202, the UE 116 to transmit information to derive timing advances for a subset of transmit-receive beam pairs for multiple receive beams.

At 1204, UE 116, in response to a timing advance update message from BS 102, transmits timing advance information for each beam pair individually or in a differential format. The differential format indicates the difference between the timing advance transmitted by the BS and a timing advance for a requested transmit receive beam pair. At 1206, a BS 102 receives the timing advance information from one or more SSs. BS 102 can send a request to transmit timing advances for all or a subset of transmit-receive beam pairs to all or some of the SSs under its coverage.

At 1208, BS 102 uses the timing advances derived from the timing advance information received from the SSs under its coverage to update one or more uplink control channel configurations and transmit the updated configurations to UE 116 via a message. At 1210, UE 116 receives the message from BS 102 that includes the one or more updated configurations and decodes slot information based on the updated configurations. At 1212, UE 116 transmits on a slot of an updated uplink control channel based on the updated configuration received in the message from BS 102.

Figure 13:
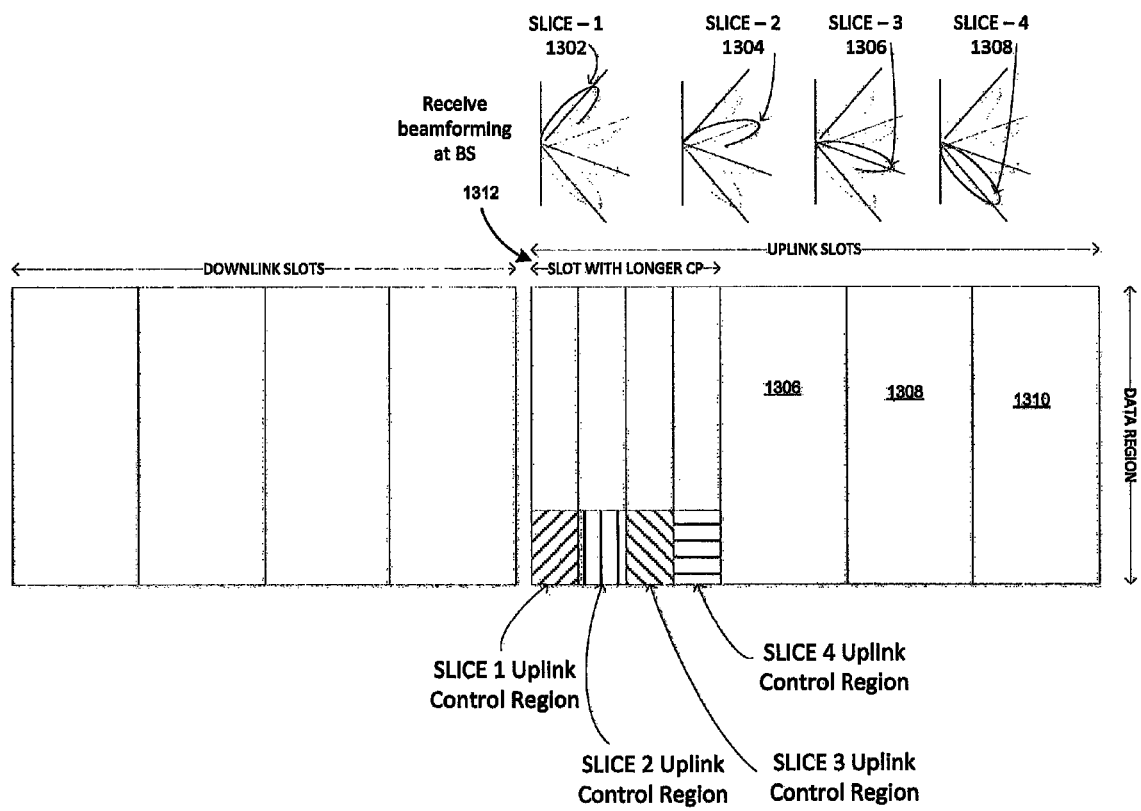
FIG. 13 illustrates multiplexing uplink control channels in slots with longer cyclic prefixes according to embodiments of the present disclosure.

FIG. 13 illustrates multiplexing uplink control channels in a slot with a longer cyclic prefix according to embodiments of the present disclosure. The embodiment shown in FIG. 11 is for illustration only. Other embodiments could be used without departing from the scope of this disclosure.

An uplink control channel belonging to different slices 1302-1308 are multiplexed in uplink slot 1312 whose symbols use a longer cyclic prefix than uplink slots 1306-1310. The longer cyclic prefix ensures that a timing advance difference between different receive beams do not cause inter-symbol interference. FIG. 13 shows slot 1312 with longer cyclic prefix carries the uplink control region for all receive beam slices 1302-1308 of BS 102. Although the illustration shows that the uplink control channel for different slices are transmitted on OFDM symbols in the slot, it is only exemplary and all other multiplexing methods (e.g., frequency and space) can also be used.

In certain embodiments of the present disclosure can have UE 116 use reciprocity between the uplink and downlink channels of a TDD system to determine the receive beam that the BS will use to decode its uplink transmission. UE 116 can use the uplink control channel configuration to identify the uplink slot in which the uplink control channel is multiplexed. After identifying the receive beam via reciprocity and the uplink slot via a channel configuration message, UE 116 can transmit on the control channel comprising an uplink control region identified via reciprocity between the UL control channel and a downlink channel.

In certain embodiments of the present disclosure in which multiple uplink slots are used for multiplexing uplink control channels associated with the receive beam, UE 116 determines the uplink slot and the resource elements in the slot to use for an uplink control channel using one or more mapping functions that involve its mobile station identification number (MSID) or a downlink control channel allocation message (e.g., PDCCH). The downlink control channel allocation message either explicitly allocates an uplink control channel or implicitly maps a downlink data grant to an uplink control channel.

UE 116 determines the uplink slot to use for its uplink control channel based on a mapping function that uses the MSID. An example of the mapping function that UE 116 uses to determine an uplink slot ($k_r$) for the uplink control channel is shown in Equation 1:

$$k_r = \mathrm{mod}(\mathrm{bin2dec}(MSID), N_r) + 1 \qquad (1)$$

where MSID is a binary string containing the identification number (MSID) associated with an UE 116, $N_r$ is the number of slots in which the uplink control channel for a particular receive beam with index r is multiplexed, bin2dec( ) is a mathematical function that converts binary numbers to a base 10 numeral and mod( ) is a modulo operator. Any suitable function involving the MSID can be constructed to determine which uplink slot UE 116 may use to transmit on the uplink control channel so long as the same function is used by both UE 116 and BS 102 in determining the uplink control channel.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method implemented by a base station (BS) to communicate with a user equipment (UE) via one or more directional beams, the method comprising:
    sending a timing advance (TA) to the UE; and
    associating an information transmission received from the UE with a set of one or more receive beams, wherein an uplink (UL) control region of a UL control channel transmission is identifiable based on the TA and the set for one or more receive beams.

2. The method of claim 1, wherein the UL control region is a first UL control region and the set of one or more receive beams comprises a first receive beam, and wherein a second UL control region is identified based on a second receive beam.

3. The method of claim 2, wherein the first UL control region and the second UL control region are multiplexed on a same UL slot.

4. The method of claim 1, wherein the UL control region used by the UE is identified based on a downlink control channel allocation message that either allocates the UL control channel transmission or maps a downlink data grant to the UL control channel transmission.

5. The method of claim 1, further comprising: sending, prior to receiving the information from the UE, a configuration message that identifies an uplink slot of the uplink control region of the uplink control channel associated with the receive beam.

6. The method of claim 1, wherein the UL control region is identified based on a reciprocity between the UL control channel transmission and a downlink channel.

7. The method of claim 1, wherein the UL control region is identified based on one or more mapping functions that involve one or more of a mobile station identification number (MSID) of the UE, or a downlink control channel allocation message; and
    wherein the downlink control channel allocation message either allocates the UL control channel transmission, or maps a downlink data grant to the UL control channel transmission.

8. A base station (BS) that communicates with a user equipment (UE) via one or more directional beams, the BS comprising:
    a transceiver including a receive path configured to receive an information transmission from the UE and a transmit path configured to send a timing advance (TA) to the UE; and
    one or more processors configured to associate the inforamtion transmission received from the UE with a set of one or more receive beams, wherein an uplink (UL) control region for a UL control channel transmission is configured to be identified at the UE based on the TA and the set of one or more receive beams.

9. The BS of claim 8, wherein the UL control region is a first UL control region and the set of one or more receive beams comprises a first receive beam; and wherein a second UL control region is identified based on a second receive beam.

10. The BS of claim 9, wherein the first UL control region and the second UL control region are multiplexed on a same UL slot.

11. The BS of claim 8, wherein the UL control region used by the UE is identified based on a downlink control channel allocation message that either allocates the UL control channel transmission or maps a downlink data grant to the UL control channel transmission.

12. The BS of claim 8, further comprising:
sending, prior to receiving the information from the UE, a configuration message that identifies an uplink slot of the uplink control region of the uplink control channel associated with the set of one or more receive beams.

13. The BS of claim 8, wherein the UL control region is identified based on a reciprocity between the UL control channel transmission and a downlink channel.

14. The BS of claim 8, wherein the UL control region is identified based on one or more mapping functions that involve one or more of a mobile station identification number (MSID) of the UE or a downlink control channel allocation message; and wherein the downlink control channel allocation message either allocates the UL control channel transmission or maps a downlink data grant to the UL control channel transmission.

15. A user equipment (UE) that communicates with a base station (BS) using one or more directional beams, the UE comprising:
at least one antenna configured to transmit data and control signals and receive a timing advance (TA) from the BS, wherein an information transmission sent by the UE is associated with a set of one or more receive beams; and
one or more processors configured to identify an uplink (UL) control region for a UL control channel transmission based on the TA and the set of one or more receive beams.

16. The UE of claim 15, wherein the UL control region is a first UL control region and the set of one or more receive beams comprises a first receive beam; and wherein a second UL control region is identified based on a second receive beam.

17. The UE of claim 16, wherein the first UL control region and the second UL control region are multiplexed on a same UL slot.

18. The UE of claim 15, wherein the UL control region used by the UE is identified based on a downlink control channel allocation message that either allocates the UL control channel transmission or maps a downlink data grant to the UL control channel transmission .

19. The UE of claim 15, further comprising:
receiving, prior to sending the information to the BS, a configuration message that identifies an uplink slot of the uplink control region of the uplink control channel associated with the set of one or more receive beams.

20. The UE of claim 15, wherein the UL control region is identified based on a reciprocity between the UL control channel transmission and a downlink channel.

21. The UE of claim 15, wherein the UL control region is identified based on one or more mapping functions that involve one or more of a mobile station identification number (MSID) of the UE or a downlink control channel allocation message; and wherein the downlink control channel allocation message either allocates the UL control channel transmission or maps a downlink data grant to the UL control channel transmission.

* * * * *

UNITED STATES PATENT AND TRADEMARK OFFICE
CERTIFICATE OF CORRECTION

PATENT NO. : 9,661,612 B2
APPLICATION NO. : 13/920965
DATED : May 23, 2017
INVENTOR(S) : Kaushik Josiam et al.

It is certified that error appears in the above-identified patent and that said Letters Patent is hereby corrected as shown below:

In the Claims

Column 14, Claim 1, Line 17, delete "of" and insert --for--.

Column 14, Claim 1, Line 19, delete "for" and insert --of--.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*